United States Patent
Mach

(10) Patent No.: US 9,503,988 B2
(45) Date of Patent: *Nov. 22, 2016

(54) METHOD, DEVICE AND COMPUTER PROGRAM PRODUCT FOR MANAGING RADIO STATES IN A MOBILE COMMUNICATION DEVICE USING DEVICE MOBILITY INFORMATION

(71) Applicant: BLACKBERRY LIMITED, Waterloo (CA)

(72) Inventor: Tomasz Henryk Mach, Slough (GB)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,332

(22) Filed: Jul. 3, 2015

(65) Prior Publication Data

US 2015/0304956 A1    Oct. 22, 2015

Related U.S. Application Data

(63) Continuation of application No. 13/848,791, filed on Mar. 22, 2013, now Pat. No. 9,107,166.

(51) Int. Cl.
*H04W 52/02* (2009.01)
*H04W 4/00* (2009.01)
*H04W 88/02* (2009.01)

(52) U.S. Cl.
CPC ..... *H04W 52/0274* (2013.01); *H04W 52/0258* (2013.01); *H04W 88/02* (2013.01); *Y02B 60/50* (2013.01)

(58) Field of Classification Search
CPC .................... H04W 52/0258; H04W 52/0274; H04W 88/02; H04W 4/001; H04W 4/008; H04W 4/027; H04W 4/028; H04W 52/0254; H04W 76/068; Y02B 60/50

USPC .......... 455/74.1, 41.2, 67.1, 68, 418, 414.1, 455/414.2
See application file for complete search history.

(56) References Cited

U.S. PATENT DOCUMENTS

| | | | |
|---|---|---|---|
| 8,180,407 B1 * | 5/2012 | Kindred | H04W 52/0251 327/544 |
| 2007/0037517 A1 * | 2/2007 | Camuffo | H04W 88/06 455/41.2 |

(Continued)

OTHER PUBLICATIONS

Mach, Tomasz Henryk, "Method, Device and Computer Program Product for Managing Radio States in a Mobile Communication Device Using Device Mobility Information", U.S. Appl. No. 13/848,791, filed Mar. 22, 2013.

*Primary Examiner* — Nathan Taylor
(74) *Attorney, Agent, or Firm* — Perry + Currier, Inc.

(57) ABSTRACT

This disclosure is directed to a method, computer program product and mobile communication device configured for managing radio states in a mobile communication device using device mobility information. A mobility state is determined from the number of cell changes over a predefined period of time. If the mobility state transitions to medium or high, such as when the user is in a vehicle, a Bluetooth™ radio is enabled. If a connection to a Bluetooth™-enabled device is available, a connection is established. When the connection is disconnected, a configurable timer is started. If the timer expires without re-establishing the connection or the mobility state transitioning to medium or high, the Bluetooth™ radio is disabled to reduce power consumption. According to an embodiment, a Wi-Fi radio may then be enabled to establish a Wi-Fi connection. Various configurations of computer program products and mobile communication devices are also described.

19 Claims, 5 Drawing Sheets

(56) References Cited

U.S. PATENT DOCUMENTS

| | | | |
|---|---|---|---|
| 2007/0037526 A1* | 2/2007 | Estable | H04W 52/0241 455/74.1 |
| 2009/0224931 A1* | 9/2009 | Dietz | H04M 1/72577 340/670 |
| 2010/0216436 A1* | 8/2010 | Wijayanathan | H04W 76/068 455/414.1 |
| 2010/0231383 A1* | 9/2010 | Levine | H04W 52/0261 340/540 |
| 2011/0117856 A1* | 5/2011 | Veluppillai | H04W 36/32 455/67.11 |
| 2011/0275321 A1* | 11/2011 | Zhou | H04M 1/6091 455/41.2 |
| 2012/0022872 A1* | 1/2012 | Gruber | G06F 17/279 704/270.1 |
| 2012/0122452 A1* | 5/2012 | Brisebois | H04W 4/025 455/434 |
| 2012/0268249 A1* | 10/2012 | Kansal | G01C 21/20 340/8.1 |
| 2012/0315960 A1* | 12/2012 | Kim | H04W 52/0254 455/574 |
| 2013/0122928 A1* | 5/2013 | Pfluger | G01P 13/00 455/456.1 |
| 2014/0162635 A1* | 6/2014 | Cui | H04W 48/18 455/434 |
| 2014/0162648 A1* | 6/2014 | Cui | H04W 48/18 455/435.3 |
| 2014/0171071 A1* | 6/2014 | Venkata | H04W 48/18 455/434 |

* cited by examiner

METHOD, DEVICE AND COMPUTER PROGRAM PRODUCT FOR MANAGING RADIO STATES IN A MOBILE COMMUNICATION DEVICE USING DEVICE MOBILITY INFORMATION

FIELD OF THE APPLICATION

The present application relates generally to mobile communication devices, and more particularly to managing short range radio states of a mobile communication device using device mobility information.

BACKGROUND OF THE APPLICATION

Mobile communication devices may have a number of radio access technologies which allow the device to connect to different types of networks and other devices such as, for example, Global Systems for Mobile communications (GSM), General Packet Radio Service (GPRS), Code Division Multiple Access (CDMA), Wideband CDMA (WCDMA), High Speed Packet Access (HSPA), Universal Mobile Telecommunication System (UMTS), Enhanced Data rates for Global Evolution (EDGE), Long Term Evolution (LTE), Orthogonal Frequency Division Multiplexing (OFDM), Ultra-Wideband (UWB), Wi-Fi™, Bluetooth™, and WiMax™.

Wi-Fi is a brand of Wireless Local Area Network (WLAN) based on IEEE 802.11 standards that may be used in homes and offices, and retail shops such as coffee shops.

Bluetooth™ is a short range radio technology that may be used to connect or pair with other Bluetooth™-enabled devices such as may be found, for example, in a device user's car audio system to allow for hands-free use of the phone capabilities of the mobile communication device. Other short range radio technologies include Wi-Fi, Near Field Communication (NFC), ZigBee, Digital Enhanced Cordless Telecommunications-Ultra Low Energy (DECT ULE), and infrared.

A constraint on modern mobile communication devices, such as smartphones, is that they have a finite battery life. If radios are kept enabled in order to detect available connections, such as to a Wi-Fi network or a Bluetooth-enabled device, the mobile communication device may consume power faster than if one or more of these radios were disabled.

Some mobile communication device users may manually switch radios on only when they are going to use them, for example, enabling the Bluetooth™ radio after they turn on their car to pair to the Bluetooth™ hands-free car kit. However, users may switch between their mobile network to a Wi-Fi network multiple times in a day. It may be inconvenient and time consuming to manually enable and disable Wi-Fi connections whenever they were or were not needed. Furthermore, some users, if they forget to enable their Bluetooth™ radio before starting their drive, may attempt to do so while driving in order to answer or make a phone call. This is undesirable as directly using the mobile communication device while driving may be dangerous to the user, other drivers and pedestrians. In some places, directly using a mobile communication device while driving is illegal. As a result, many mobile communication device users may simply leave these radios enabled all the time, wasting battery life.

BRIEF DESCRIPTION OF THE DRAWINGS

Reference will now be made to the accompanying drawings which show, by way of example, embodiments according to the present disclosure, and in which.

Like reference numerals indicate like or corresponding elements in the drawings.

DETAILED DESCRIPTION OF THE EMBODIMENTS

Figure 1:
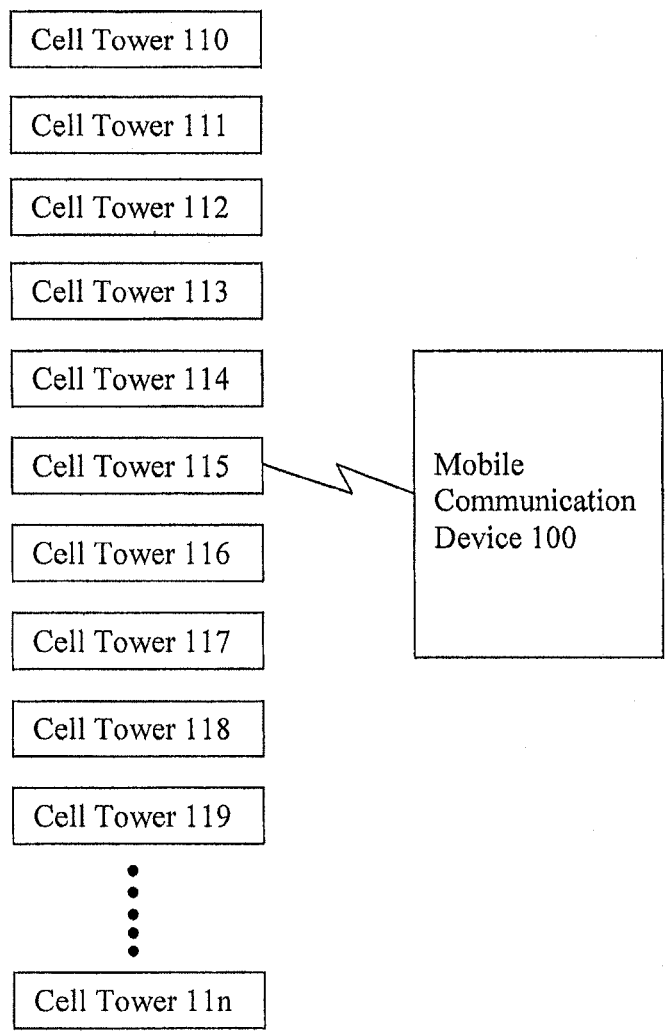
FIG. 1 shows an exemplary mobile communication device transmitting and receiving data via one of a series of cell towers according to an embodiment of the disclosure.

The present disclosure generally provides a method, computer program product, and mobile communication device for managing radio states in a mobile communication device through managing radio states using device mobility information. Various configurations of computer program products, mobile communication devices and systems for achieving the above are described.

According to one embodiment, the present disclosure comprises a method for managing radio states in a mobile communication device, the method comprising: monitoring a mobility state of the mobile communication device; when the mobility state transitions to a mobility state which is at or above a predetermined threshold, enabling a first short range radio on the mobile communication device; establishing a connection with a compatible first short range radio-enabled device using the first short range radio; and when the first short range radio connection is disconnected, disabling the first short range radio after a first predetermined period of time during which both the mobility state is below the predetermined threshold and the first short range radio connection is not reestablished.

According to another embodiment, the present disclosure comprises a computer program product configured for managing radio states in a mobile communication device, the computer program product comprising code which, when loaded into a memory and executed on an associated processor, is adapted to perform: monitoring a mobility state of the mobile communication device; when the mobility state transitions to a mobility state which is at or above a predetermined threshold, enabling a first short range radio on the mobile communication device; establishing a first short range radio connection with a compatible first short range radio-enabled device using the first short range radio; and when the first short range radio connection is disconnected, disabling the first short range radio after a first predetermined period of time during which both the mobility state is below the predetermined threshold and the first short range radio connection is not reestablished.

According to another embodiment, the present disclosure comprises a mobile communication device configured for managing radio states in the mobile communication device, the mobile communication device comprising: a mobility state module configured to monitor a mobility state of the mobile communication device; a first short range radio module configured to enable and disable a short range radio on the mobile communication device, and to establish a first short range radio connection with a compatible first short range radio-enabled device using the first short range radio; a control module operatively associated with the mobility state module to receive the mobility state of the mobile communication device and operatively associated with the first short range radio module to receive a notification that the first short range radio connection has been disconnected, the control module being configured to: when the mobility state transitions to a mobility state which is at or above a predetermined threshold, communicate with the first short range radio module to enable the first short range radio, and after receiving the notification that the first short radio range connection has been disconnected, communicate with the first short range radio module to disable the first short range radio after a first predetermined period of time during which both the mobility state is below the predetermined threshold and the first short range radio connection is not reestablished.

Reference is first made to FIG. 1, which shows a mobile communication device according to an embodiment and indicated generally by reference 100. According to an embodiment, the mobile communication device 100 comprises a mobile communication device such as a BlackBerry™ handheld device or a cellular phone or communication device or other type of handheld device. The mobile communication device 100 is shown transmitting and receiving data via cell site or tower 115. Cell tower 115 is one of a series of cell towers 110, 111, . . . 119, . . . 11n spaced apart at an approximate distance interval which may depend on the population density of potential cell users and the particular communication technology used, for example 2-3 kilometers apart in suburban areas and 400-800 meters apart in urban areas.

When a user carrying a mobile communication device 100 is in motion, the mobile communication device 100 may switch to another (typically closer) cell tower. When the user carrying the mobile communication device 100 is in a vehicle, the rate of switching cell towers may generally be more rapid than when, for example, the user is walking. The number of cell switches over a particular period of time may be measured to determine the rate of switching cell towers and, from that rate, a mobility state may be assigned such as low, medium, or high. For example, a low mobility state may be assigned to indicate that the mobile communication device 100 has made a number of cell switches over a given period of time which is in a lower range, a high mobility state may be assigned to indicate that the mobile communication device 100 has made a number of cell switches over the given period of time which is in a higher range and a medium mobility state may be assigned to indicate that the mobile communication device 100 has made a number of cell switches over a given period of time which is between the lower range and the higher range.

According to an embodiment, the mobility detection may be implemented using, for example, 3GPP-based technologies such as Universal Mobile Telecommunications Systems (UTMS) and Long Term Evolution (LTE) as there is a terminal mobility detection mechanism defined in the 3GPP specifications of the modem. This is described in Technical Specification (TS) 25.304 for UMTS and TS 36.304 for LTE. This terminal mobility detection mechanism is based on the number of cell changes during a period of time. In UTMS or LTE networks, the number of cell changes and the period of time may be configurable by the cellular network administrator and may be provided by the cellular network to the mobile communication device 100 as broadcasted system information. In practice, when the mobile communication device 100 is moving quickly (e.g. when in a car), the device 100 may change cells frequently. There may be infrequent or no changes when the device 100 is stationary. Based on the number of cell changes and period of time parameters, different mobility states may be defined as follows: a) for UMTS, low and high mobility states; b) for LTE, low, medium and high mobility states. Initially, the mobile communication device is in the low mobility state and may move to the medium or high mobility state if the number of cell changes during a predefined period of time (e.g. 60 seconds) goes to or above network predetermined thresholds (e.g. 3 for medium mobility, 10 for high mobility). Then, if the mobile communication device 100 stops moving again and the number of cell changes during the predefined period of time drops, the mobile communication device 100 may return to the low mobility state. According to a further embodiment, other mechanisms may be used to determine the mobility state, such as using a Global Positioning System (GPS) receiver on the mobile communication device 100 to measure distance travelled over a period of time, or user input, for example, by scheduling predefined time periods during the week where the mobility state is designated as medium or high, or a mobility key on the user interface of the device 100, such as the keypad, to toggle the mobile communication device 100 in or out of a high mobility state.

The mobility state of the mobile communication device 100 may be used to trigger the enabling of a first short range radio, which according to an embodiment is a Bluetooth radio, as described below. According to further embodiments, the first short range radio may be, for example, a Wi-Fi (WLAN) radio, NFC radio, a ZigBee radio, a DECT ULE radio, an infrared radio, or the like.

Figure 2:
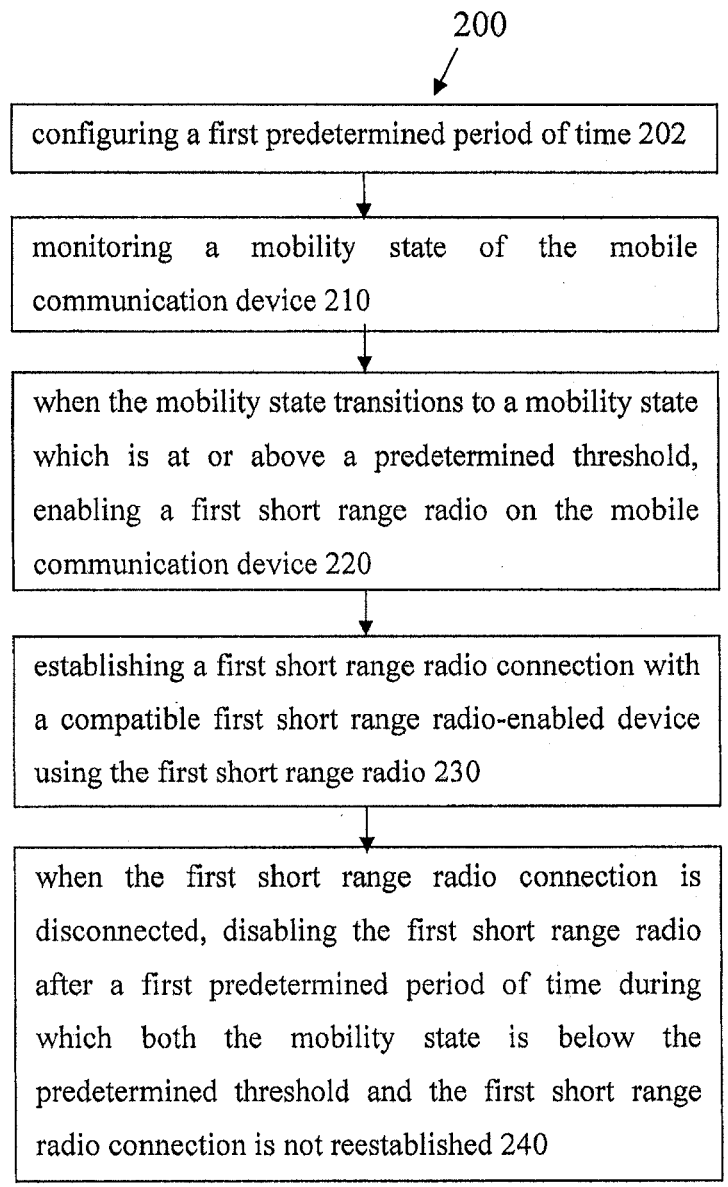
FIG. 2 shows an exemplary flow diagram of a method for managing radio states in a mobile communication device using device mobility information according to an embodiment of the disclosure.

Referring now to FIG. 2, according to an embodiment of the method of the present disclosure indicated generally by reference 200, a mobility state of the mobile communication device is monitored in step 210. When the mobility state transitions to a mobility state which is at or above a predetermined threshold, then a first short range radio on the mobile communication device 100 is enabled at 220. This mobility state transition may indicate that the mobile communication device user is moving at an increased speed, such as in a motor vehicle. According to an embodiment, the predetermined threshold may be defined as a medium mobility state. According to a further embodiment, the predetermined threshold may be defined as a high mobility state. According to a yet further embodiment, the predetermined threshold may be defined as a number of cell changes within a predefined period of time. According to a further embodiment, the predetermined threshold may be configured using the mobile communication device 100. According to a further embodiment, a check may be made to determine if the first short range radio is already enabled, such as from being manually enabled by the user, and according to this embodiment the first short range radio is only enabled if not already enabled.

The enabled first short range radio may then search for available connections and in step 230 a first short range radio connection is established with a compatible first short range radio-enabled device using the first short range radio. The first short range radio connection, such as a Bluetooth™ connection, may then be used, for example, to make or receive calls or for other purposes.

At some later time, the first short range radio connection may be disconnected. This could occur for a variety of reasons, for example, that the other first short range radio-enabled device has been turned off or its first short range radio has otherwise been disabled, that the mobile communication device 100 has gone out of range of the other first short range radio-enabled device, or a communication error between the devices which has led to the connection being dropped.

According to step 240 of the method shown in FIG. 2, when the first short range radio connection is disconnected, the first short range radio is disabled after a first predetermined period of time during which both the mobility state is below the predetermined threshold and the first short range radio connection is not reestablished.

The first predetermined period of time may be configured in step 202. This configuration may include the initial configuration of the mobile communication device, i.e. factory defaults, as well as user configuration of the first predetermined period of time through settings configured through the user interface and input devices of the mobile communication device 100. In some embodiments, the first predetermined period of time may be set to any time value, including 0 seconds. According to an embodiment, the first predetermined period of time may be set to one of 30 seconds, 60 seconds, 2 minutes or 5 minutes, and may be implemented by way of a timer. The first predetermined period of time may be considered a grace period after a first short range radio disconnection during which the connection can be reestablished even though the mobility state is below the predetermined threshold.

This may be advantageous, for example, when the user is driving, stops his or her car, turns off the engine and car completely, and then turns the audio system of the car back on without starting the engine because, for example, he or she will be waiting in the car for some period of time. Turning the car off may turn off the first short range radio in the car's audio system thereby disconnecting the short range radio connection with the mobile communication device 100. However, the subsequent powering on of the audio system will allow the first short range radio connection to be reestablished since the first short range radio on the mobile communication device 100 was not disabled immediately upon the first short range radio connection being disconnected although the mobile communication device 100 was in a mobility state that is below the predetermined threshold. Moreover, the above conditions of both the mobility state being below the predetermined threshold and the first short range radio connection being disconnected over a first predetermined period of time may avoid unnecessary and unwanted disabling of the first short range radio when a vehicle stops for short periods of time, such as stopping at traffic lights or train crossings.

Figure 3:
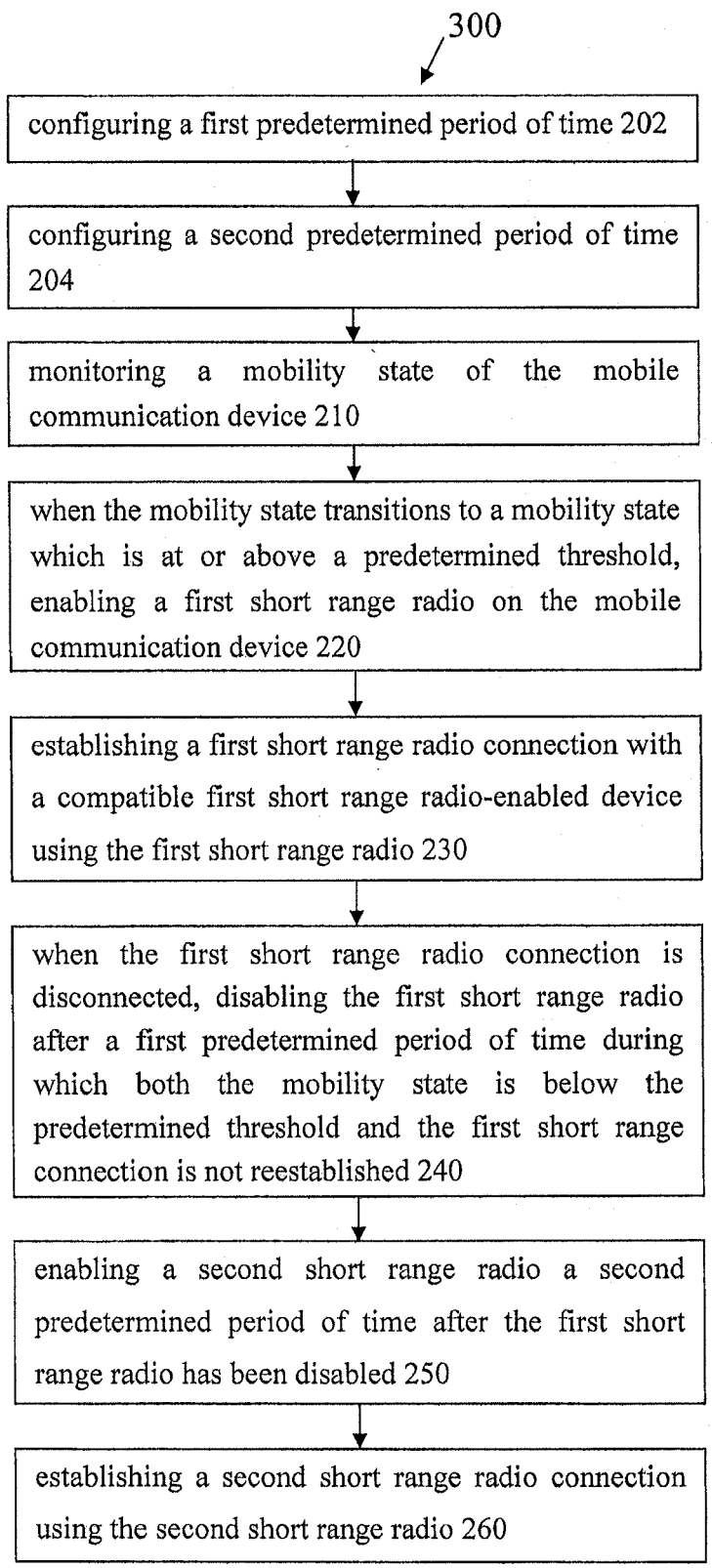
FIG. 3 shows an exemplary flow diagram of a method for managing radio states in a mobile communication device using device mobility information according to a further embodiment of the disclosure.

Referring now to FIG. 3, a further embodiment of the method of the disclosure indicated generally by reference 300 is shown. Steps 202, 210, 220, 230, and 240 are as described in FIG. 2. When the first short range radio is disabled in step 240, the mobile communication device 100 is below the predetermined threshold. For example, the device 100 may be in a low mobility state, which may indicate that the user has become stationary. In step 250, a second short range radio, such as a Wi-Fi radio, may be enabled after a second predetermined period of time after the first short range radio has been disabled in step 240. According to further embodiments, the second short range radio may be, for example, a Bluetooth™ radio, NFC radio, a ZigBee radio, a DECT ULE radio, or an infrared radio or the like.

The enabled second short range radio searches for available connections and in step 260, a second short range radio connection is established, such as with a WLAN at the user's home or office, using the second short range radio. The second predetermined period of time may be configured in step 204. This configuration may include the initial configuration of the mobile communication device, i.e. factory defaults, as well as user configuration of the second predetermined period of time through settings configured through the user interface and input devices of the mobile communication device 100. In some embodiments, the second predetermined period of time may be set to any time value. According to an embodiment, the second predetermined period of time may be 0 seconds. According to a further embodiment, it may be set as 1 minute, 2 minutes, 5 minutes, or 10 minutes. The second predetermined period of time allows for time spacing between when the first short range radio is disabled and the second short range radio is enabled.

This may be advantageous, for example, when the user carrying the mobile communication device 100, has commuted to a parking location near his or her workplace and has a short walk to his or her office, and similarly, when the user has commuted home and there is a short distance from their garage, driveway or other parking location to their house or apartment. In this circumstance, it may be unnecessary to immediately enable the second short range radio, but it may be useful if the device automatically enabled the second short range radio after a short period of time, such as a few minutes, had passed and then searched for available second short range radio connections, such as to the user's home or office WLAN network.

Figure 4:
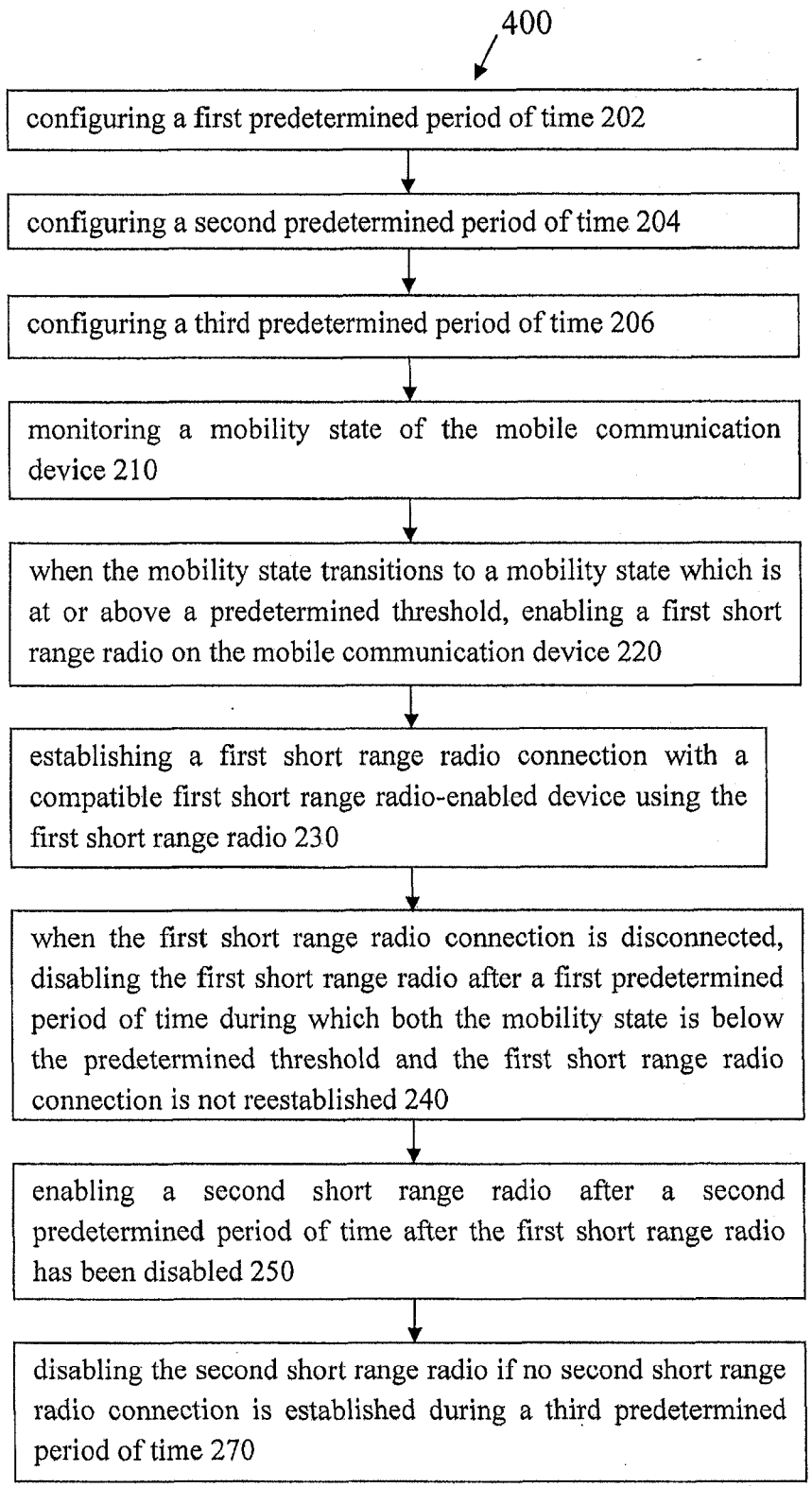
FIG. 4 shows an exemplary flow diagram of a method for managing radio states in a mobile communication device using device mobility information according to a yet further embodiment of the disclosure.

Referring now to FIG. 4, a further embodiment of the method of the disclosure indicated generally by reference 400 is shown. Steps 202, 204, 210, 220, 230, 240, and 250 are as described in FIGS. 2 and 3. In step 270, the second short range radio is disabled after a third predetermined period of time if no second short range radio connection is established. The third predetermined period of time may be configured in step 206. This configuration may include the initial configuration of the mobile communication device, i.e. factory defaults, as well as user configuration of the third predetermined period of time through settings configured through the user interface and input devices of the mobile communication device 100. In some embodiments, the third predetermined period of time may be set to any time value, including 0 minutes. According to an embodiment, the third predetermined period of time may be set to one of 5 minutes, 10 minutes, 15 minutes or 30 minutes. The third predetermined period of time may be considered a grace period for establishing a second short range radio connection after which the second short range radio is turned off which may reduce power consumption.

According to a further embodiment, if no data is exchanged over the established first short range radio connection during a fourth predetermined period of time, the first short range radio connection may be disconnected and the first short range radio may be disabled to, for example, reduce power consumption. The fourth predetermined period of time may be configured in the initial configuration of the mobile communication device, i.e. factory defaults, as well as by user configuration through settings configured through the user interface and input devices of the mobile communication device 100. In some embodiments, the fourth predetermined period of time may be set to any time value, including 0 minutes. According to an embodiment, the fourth predetermined period of time may be set to one of 5 minutes, 10 minutes, 15 minutes or 30 minutes, According to a yet further embodiment, if no first short range radio connection is detected, the first short range radio is disabled after finishing its search procedure in order which may reduce power consumption.

According to a further embodiment, the second short range radio may be disabled due to no data being exchanged over an established second short range radio connection for a fifth predefined period of time. The fifth predetermined period of time may be configured in the initial configuration of the mobile communication device, i.e. factory defaults, as well as by user configuration through settings configured through the user interface and input devices of the mobile communication device 100. In some embodiments, the fifth predetermined period of time may be set to any time value, including 0 minutes. According to an embodiment, the fifth predetermined period of time may be set to one of 5 minutes, 10 minutes, 15 minutes or 30 minutes.

According to a further embodiment of the disclosure, when the mobile communication device 100 transitions to a mobility state at or above a predetermined threshold, the second short range radio may be enabled and a search is performed for available connections. If an available connection is found, a second short range radio connection may be established. If no connection is found, then the second short range radio may be disabled after a sixth predefined period of time. The sixth predetermined period of time may be configured in the initial configuration of the mobile communication device, i.e. factory defaults, as well as by user configuration through settings configured through the user interface and input devices of the mobile communication device 100. In some embodiments, the sixth predetermined period of time may be set to any time value, including 0 minutes. According to an embodiment, the sixth predetermined period of time may be set to one of 5 minutes, 10 minutes, 15 minutes or 30 minutes. This embodiment may be advantageous where the user travels by train or other passenger vehicle, which may, for example, include Wi-Fi access. According to a further embodiment, a second short range radio on the mobile communication device may be disabled after the mobility state transitions to a mobility state at or above the predetermined threshold, for example, a medium or high mobility state, if no second short range radio connection is present.

Figure 5:
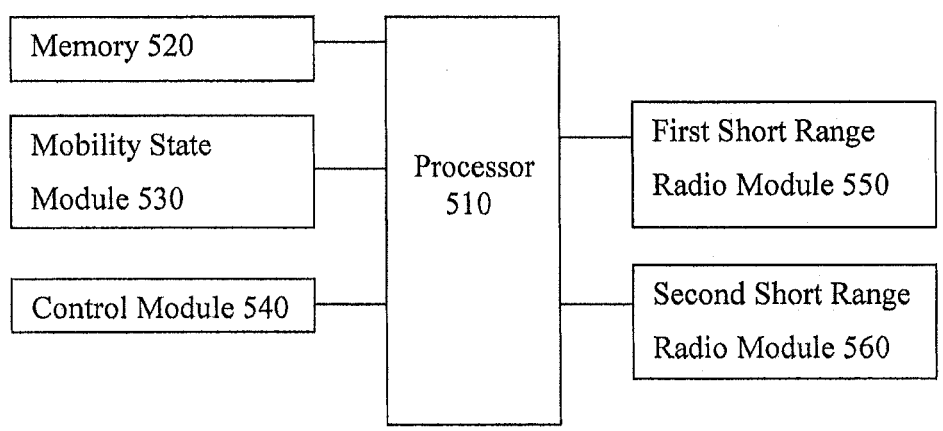
FIG. 5 is a partial schematic of an exemplary mobile communication device configured for managing radio states in a mobile communication device using device mobility information according to an embodiment of the disclosure.

Referring now to FIG. 5, a partial schematic of an embodiment of a mobile communication device 100 configured for managing radio states in the mobile communication device of the disclosure is shown. According to an embodiment, the mobile communication device 100 may be implemented with voice and data communication functionality. The mobile communication device 100 comprises a processor 510 that operates under the control of a program (i.e. stored program control) and executes code or instructions, in the form of firmware or software, stored in program memory 520. The processor 510 may be also provided with data memory (not shown). In known manner, the processor may be also operatively coupled to a keyboard or keypad, a display module and other input devices such as a trackball, trackpad or touch screen, and an audio transducer or speaker. The mobile communication device 100 includes a RF, demodulation/modulation and decoding/coding circuits (not shown), and a suitable RF antenna (not shown). The RF demodulator/modulator and decoder/coder circuits and the RF antenna are operatively coupled to the processor and provide an interface for wireless communication via the first short range radio through first short range radio module 550 and via the second short range radio through second short range radio module 560, as well as modules for other wireless communication technologies (not shown). The first short range radio module 550 may be configured to enable and disable a first short range radio (such as a Bluetooth™ radio), and to establish a first short range radio connection with a compatible first short range radio-enabled device. Similarly, the second short range radio module 560 may be configured to enable and disable a second short range radio (such as a Wi-Fi radio), and to establish a second short range radio connection.

A mobility state module 530 may be provided which may determine or monitor the mobility state of the mobile communication device 100 either by the number of cell switches over a predetermined period of time as discussed above, by other means discussed above, or by other means known to a skilled person for determining the mobility state of the mobile communication device 100.

A control module 540 is also provided which may communicate with the first short range radio module 550 to enable the first short range radio when the mobility state transitions to a mobility state at or above a predetermined threshold and may also be configured to receive a notification from the first short range radio module 550 to disable the first short range radio after a first predetermined period of time during which both the mobility state is below the predetermined threshold and the first short range radio connection is not established. According to an embodiment, the control module 540 is also configured to communicate with the second short range radio module 560 to enable the second short range radio after the second predetermined period of time after the first short range radio has been disabled. According to a further embodiment, the control module 540 is also configured to communicate with the second short range radio module 560 to disable the second short range radio after the third predetermined period of time if no second short range radio connection is established.

According to an embodiment, the control module 540 is also configured to communicate with the first short range radio module 550 to disable the first short range radio after the fourth predetermined period of time if during that time no data is exchanged over the first short range radio connection. According to a further embodiment, the control module 540 is also configured to communicate with the second short range radio module 560 to disable the second short range radio after the fifth predetermined period of time if during that time no data is exchanged over the second short range radio connection. According to a further embodiment, the control module 540 is also configured to communicate with the second short range radio module 560 to disable the second short range radio after the sixth predetermined period of time if during that time no second short range radio connection is established. According to a further embodiment, the control module 540 is also configured to communicate with the first short range radio module 550 to disable the first short range radio if no first short range radio connection is detected after finishing its search procedure which may reduce power consumption. According to a further embodiment, the control module 540 is also configured to communicate with the second short range radio module 560 to disable the second short range radio if no second short range radio connection is detected after finishing its search procedure which may reduce power consumption.

The methods described in the disclosure may be implemented according to mobile communication device architectures other than that shown in FIG. 5 and described in the preceding few paragraphs. The designs of such mobile communication device architectures would be within the knowledge of the skilled person in this art.

According to a further embodiment of the disclosure, the connection history of the mobile communication device 100 may also be employed to assist in determining when and whether to enable or disable a first short range radio or a second short range radio. For example, for some users, generally consistent time intervals between the user disconnecting from a first short range radio connection and establishing a second short range radio connection may be extracted by analyzing the device's connection history. This historical information of the device's connections and disconnections may be used to configure the various predetermined periods of time described throughout the disclosure. It may also be employed to determine whether to enable a radio at all. For example, if the connection history shows a disconnection from a home WLAN network and then a connection to an office WLAN network 30 minutes later, without any connections during that 30 minute interval, it may indicate that the user's commute from home to work does not involve being in proximity with a compatible first short range radio-enabled device and therefore power consumption may be reduced by not enabling the first short range radio during that time period at all. In some embodiments, this functionality may be optionally selected by the user, for example, through toggling an option of "Learn from my connection history" which, if selected, may cause the device software to analyze the connection history over, for example, the past 15 or 30 days to attempt to identify patterns in the data using conventional data analysis techniques.

According to an embodiment, the automatic enabling and disabling of the first short range and second short range radios described above may be toggled on or off by the user of the mobile communication device 100, for example, using the user interface and the keypad or other input devices. For example, the automatic enabling and disabling of the first short range and second short range radios may be independently configured, in the case of Bluetooth™ and Wi-Fi radios, through user-selectable options such as: BLUETOOTH™ ALWAYS ON, BLUETOOTH™ ALWAYS OFF, or BLUETOOTH™ AUTOMATIC, and WI-FI ALWAYS ON, WI-FI ALWAYS OFF, or WI-FI AUTOMATIC.

According to embodiments of the present disclosure, acts associated with the methods described herein may be implemented as coded instructions in computer program products, each of the computer program products being a computer-readable medium upon which software code is recorded to execute appropriate portions of the method when the software code is loaded into memory and executed on an operatively associated processor.

The present disclosure may be embodied in other specific forms without departing from the spirit or essential characteristics thereof. Certain adaptations and modifications of the disclosure will be obvious to those skilled in the art. Therefore, the presently discussed embodiments are considered to be illustrative and not restrictive, the scope of the disclosure being indicated by the appended claims rather than the foregoing description, and all changes which come within the meaning and range of equivalency of the claims are therefore intended to be embraced therein.

What is claimed is:

1. A method comprising:
   when a mobility state of a mobile device is at or above a first predetermined threshold, enabling a first short-range radio and establishing a first short-range radio connection;
   when the first short-range radio connection is disconnected, disabling the first short-range radio after a first predetermined time period during which: the mobility state is below the first predetermined threshold; and, the first short-range radio connection is not re-established;
   when the mobility state is at or above a second predetermined threshold, enabling a second short-range radio after a second predetermined time period that follows the first short-range radio being disabled; and,
   when no second short-range radio connection is established during a third predetermined time period, disabling the second short-range radio.

2. The method of claim 1, further comprising establishing the first short-range radio connection after the first short-range radio is enabled.

3. The method of claim 1, further comprising monitoring the mobility state of the mobile device.

4. The method of claim 1, wherein the first short-range radio comprises a Bluetooth™ radio.

5. The method of claim 1, further comprising configuring the first predetermined time period.

6. The method of claim 1, wherein the second short-range radio comprises a Wi-Fi radio.

7. The method of claim 1, further comprising configuring the second predetermined time period.

8. The method of claim 1, further comprising, when the second short-range radio connection is not established, and after the mobility state is at or above the first predetermined threshold, disabling the second short-range radio.

9. The method of claim 1, further comprising configuring the third predetermined time period.

10. A mobile device comprising:
    a processor, a first short-range radio, and, a second short-range radio, the processor configured to:
    when a mobility state of a mobile device is at or above a first predetermined threshold, enable the first short-range radio and establishing a first short-range radio connection;
    when the first short-range radio connection is disconnected, disable the first short-range radio after a first predetermined time period during which: the mobility state is below the first predetermined threshold; and, the first short-range radio connection is not re-established;
    when the mobility state is at or above a second predetermined threshold, enable the second short-range radio after a second predetermined time period that follows the first short-range radio being disabled; and,
    when no second short-range radio connection is established during a third predetermined time period, disable the second short-range radio.

11. The mobile device of claim 10, wherein the processor is further configured to establish the first short-range radio connection after the first short-range radio is enabled.

12. The mobile device of claim 10, wherein the processor is further configured to monitor the mobility state of the mobile device.

13. The mobile device of claim 10, wherein the first short-range radio comprises a Bluetooth™ radio.

14. The mobile device of claim 10, wherein the processor is further configured to configure the first predetermined time period.

15. The mobile device of claim 10, wherein the second short-range radio comprises a Wi-Fi radio.

16. The mobile device of claim 10, wherein the processor is further configured to configure the second predetermined time period.

17. The mobile device of claim 10, wherein the processor is further configured to when the second short-range radio connection is not established, and after the mobility state is at or above the first predetermined threshold, disable the second short-range radio.

18. The mobile device of claim 10, wherein the processor is further configured to configure the third predetermined time period.

19. A non-transitory computer-readable medium storing a computer program, wherein execution of the computer program is for:

when a mobility state of a mobile device is at or above a first predetermined threshold, enabling a first short-range radio and establishing a first short-range radio connection;

when the first short-range radio connection is disconnected, disabling the first short-range radio after a first predetermined time period during which: the mobility state is below the first predetermined threshold; and, the first short-range radio connection is not re-established;

when the mobility state is at or above a second predetermined threshold, enabling a second short-range radio after a second predetermined time period that follows the first short-range radio being disabled; and, when no second short-range radio connection is established during a third predetermined time period, disabling the second short-range radio.

* * * * *